UNITED STATES PATENT OFFICE.

CARL BOSCH, ALWIN MITTASCH, AND LEOPOLD HECHT, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCTION OF AMMONIUM SULFATE.

1,063,007.     Specification of Letters Patent.     Patented May 27, 1913.

No Drawing.     Application filed January 21, 1913. Serial No. 743,279.

*To all whom it may concern:*

Be it known that we, CARL BOSCH, ALWIN MITTASCH, and LEOPOLD HECHT, subjects, respectively, the first and third of the King of Prussia and the second of the King of Saxony, residing at Ludwigshafen-on-the-Rhine, Germany, have invented new and useful Improvements in the Production of Ammonium Sulfate, of which the following is a specification.

Ammonium bisulfite can readily be obtained by simply treating aqueous ammonia solution with sulfur dioxid. It has been known since 1880 that a solution of ammonium bisulfite, when heated, in a sealed glass tube, to a temperature of about 150° C., is converted into sulfate of ammonia, sulfur and sulfuric acid (see *Berichte*, 13, 2325). No commercial manufacture of sulfate of ammonia based upon this reaction has taken place up to the present application for patent, the sulfate of ammonia of commerce being prepared by saturating dilute sulfuric acid with ammonia gas. The sulfuric acid is of course obtained from sulfur dioxid by the well known treatment in sulfuric acid chambers, or other sulfuric acid plant. The reason why sulfate of ammonia has not been commercially manufactured from ammonium bisulfite appears to be that the reaction is very liable to take place with great violence, even amounting to explosive force.

According to our invention, sulfate of ammonia is manufactured directly from sulfites of ammonia, as hereinafter explained, so as to render sulfuric acid plant unnecessary for such manufacture.

The manufacture according to our invention can be carried out by heating ammonium bisulfite, preferably in aqueous solution, in the presence of a suitable catalytic agent, the reaction taking place at comparatively low temperature and without undue increase of pressure occurring. Sulfur is a suitable catalytic agent and a suitable initial temperature for starting the reaction, when using sulfur, is from 50 to 100° C. Although sulfur is the catalytic agent which we especially recommend for use according to our invention, other catalytic agents can be employed, and we instance as such other agents selenium, tellurium, or arsenic, or compounds thereof, such for example as ammonium selenite, or arsenious acid. Or suitable metallic compounds can be used. such for instance as iron salts, or oxids, sulfates, chlorids, or other compounds, of aluminium, cerium, cobalt, chromium, copper, mercury, potassium, manganese, molybdenum, nickel, lead, uranium, vanadium, tungsten, or zinc, also metals themselves, such for instance as mercury, platinum, lead, copper, or iron, can be employed in carrying out our invention. The use of sulfur as the catalytic agent according to this invention has the advantage that no foreign substance is then introduced into the reaction mixture.

A simple method of carrying out the invention consists in first decomposing a small quantity of ammonium bisulfite solution, thus producing some sulfur, and then gradually adding further quantities of ammonium bisulfite solution to the reaction mixture which contains the necessary catalytic agent in the form of sulfur. In this way the process can be carried out continuously.

During the treatment of ammonium bisulfite according to this invention, some sulfuric acid is formed, and it is often advantageous to carry out the reaction in the presence of ammonium sulfite, provided that the quantity taken is not too great. The proportion of ammonium sulfite which can advantageously be mixed with the ammonium bisulfite should not exceed, but should preferably be somewhat less than that represented by the following equation

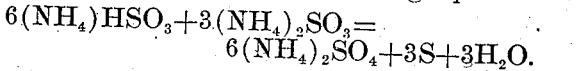
$$6(NH_4)HSO_3 + 3(NH_4)_2SO_3 = \\ 6(NH_4)_2SO_4 + 3S + 3H_2O.$$

In carrying out the above reaction, if concentrated solutions of bisulfite be employed, a part of the ammonium sulfate crystallizes out, especially if the free sulfuric acid formed in the absence of sufficient ammonium sulfite be neutralized with ammonia, and the other part of the ammonium sulfate contained in the mother liquor can be obtained by evaporation. The sulfur can be separated in any convenient manner, for instance in the liquid form from solid ammonium sulfate, or in the solid form by filtration from the ammonium sulfate solution.

The solution of ammonium bisulfite employed can be obtained by passing sulfur dioxid and ammonia in the corresponding proportions into water, or by dissolving its anhydrid (usually termed ammonium pyrosulfite) in water, and although we prefer to carry out the reaction while employing the ammonium bisulfite in the form of a solution, if desired, the crystalline form can be employed, such for instance as is obtained by allowing the ammonium bisulfite to crystallize, and then filtering off and pressing the crystals.

The following are examples of how our invention can be carried into practical effect, but the invention is not confined to these examples.

Example 1: Add a quantity of powdered sulfur to a concentrated solution of ammonium bisulfite and heat and stir the mixture in an autoclave, at about 90° C. The reaction takes place with the development of heat and is finished in a few hours, the reaction being accelerated in accordance with the amount of sulfur which is present. If desired, the rise of temperature can be regulated by means of external, or internal, cooling, or both.

Example 2: Add from 5 to 10% of sulfur to a saturated solution of ammonium bisulfite which may, if desired, also contain ammonium sulfite and ammonium sulfate, and then heat slowly, in an autoclave, until a temperature of from 70° to 80° C. has been attained, and maintain this temperature, if necessary cooling the mass by means of cooling coils or by injecting water or a cold sulfate solution or the like, care being taken, however, that the said temperature of from 70° to 80° C. is not exceeded for a period of several hours. When the chief reaction has taken place, allow the temperature to rise to, for instance, from 100° to 120° C., and finally work up the mass in any desired manner. When selenium (either alone or in combination with sulfur or other catalytic agent) is employed, extremely small quantities are sufficient to promote the reaction according to this invention, and in this case also the reaction can be carried out by starting at lower temperatures, for instance at about 60° C., or below.

Now what we claim is:—

1. The process of producing ammonium sulfate by heating ammonium bisulfite with a catalytic agent.

2. The process of producing ammonium sulfate by heating ammonium bisulfite with a catalytic agent in the presence of water.

3. The process of producing ammonium sulfate by heating ammonium bisulfite and ammonium sulfite with a catalytic agent.

4. The process of producing ammonium sulfate by heating ammonium bisulfite and ammonium sulfite with a catalytic agent in the presence of water.

5. The process of producing ammonium sulfate by heating ammonium bisulfite with sulfur.

6. The process of producing ammonium sulfate by heating ammonium bisulfite and ammonium sulfite with sulfur.

7. The process of producing ammonium sulfate by heating ammonium bisulfite and ammonium sulfite with sulfur in the presence of water.

In testimony whereof we have hereunto set our hands in the presence of two subscribing witnesses.

CARL BOSCH.
ALWIN MITTASCH.
LEOPOLD HECHT.

Witnesses:
J. ALEC. LLOYD,
JOSEPH HEIFFER.